Feb. 25, 1941.   A. NEVEU   2,232,883
FLUID PRESSURE BRAKE
Filed March 25, 1939   3 Sheets-Sheet 2

INVENTOR
ANSELME NEVEU
BY
ATTORNEY

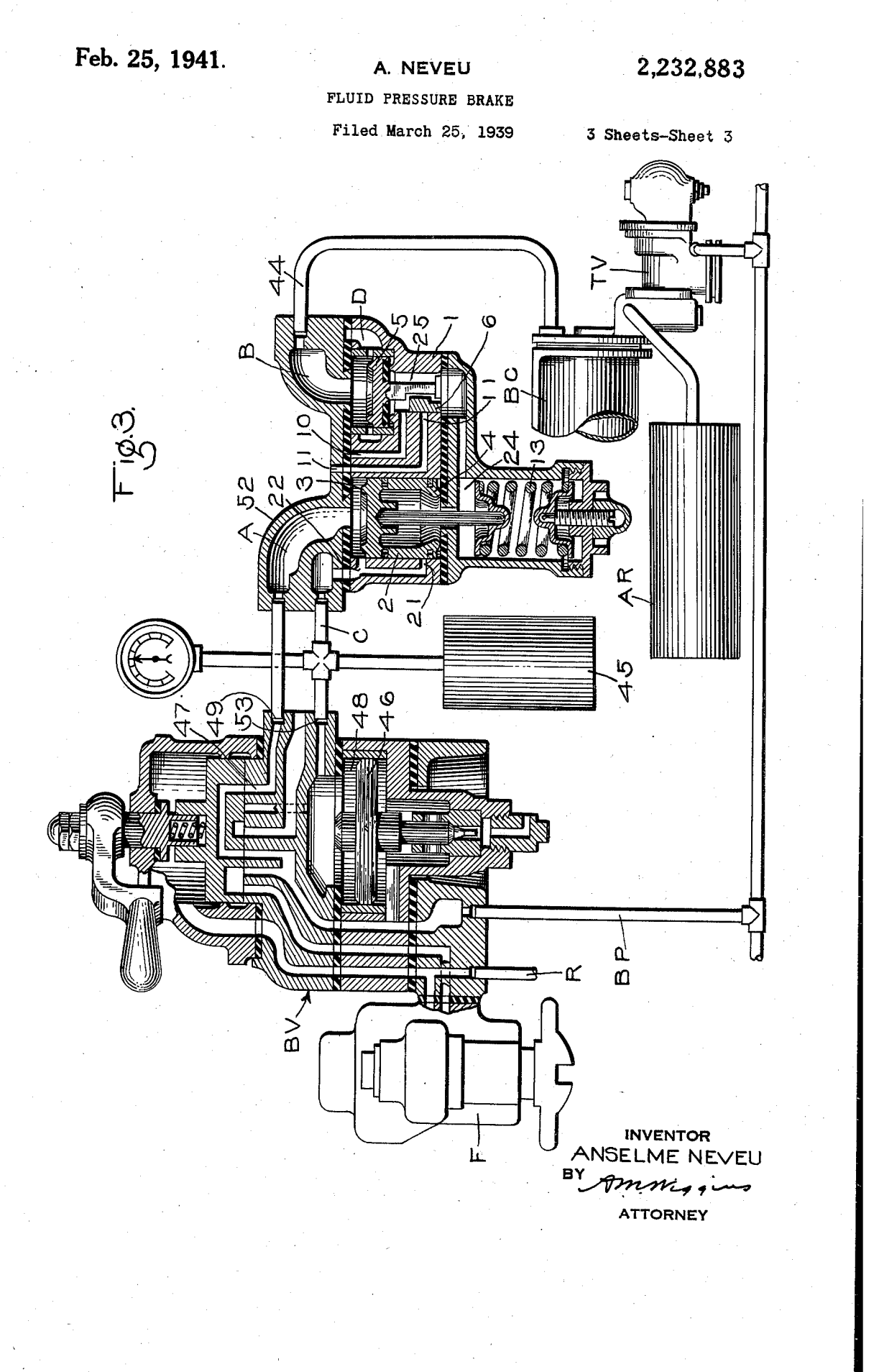

Feb. 25, 1941. A. NEVEU 2,232,883
FLUID PRESSURE BRAKE
Filed March 25, 1939 3 Sheets-Sheet 3

INVENTOR
ANSELME NEVEU
BY
ATTORNEY

Patented Feb. 25, 1941

2,232,883

UNITED STATES PATENT OFFICE 2,232,883

FLUID PRESSURE BRAKE

Anselme Neveu, Livry-Gargan, France, assignor, by mesne assignments, to The Westinghouse Air Brake Company, Wilmerding, Pa., a corporation of Pennsylvania Application March 25, 1939, Serial No. 264,184
In France June 1, 1938

10 Claims. (Cl. 303—63)

The present invention relates to fluid pressure braking apparatus and more particularly to arrangements for ensuring automatic application and preventing release of the brakes when the pressure in a reservoir or in a pipe decreases below a predetermined limit.

The principal object of the present invention is to provide an improved and simply constructed valve device for use either in straight air or automatic brake systems, for insuring automatic application and preventing release of the brakes when the pressure in a reservoir or in a pipe decreases below a predetermined degree.

The principal feature of the present invention consists in a valve device comprising a spring loaded abutment upon which the pressure to be checked acts, and which upon excessive decrease of the pressure effects a sudden alteration of pressure in a chamber controlling the automatic application of the brakes by means of fluid from an auxiliary reservoir.

According to a preferred embodiment, this abutment controls the admission of fluid pressure to a freely movable abutment provided with a valve for bringing the abutment to a position in which the valve effects an automatic application of the brakes.

In order that the present invention may be readily understood, three constructional forms of the invention are illustrated by way of nonlimitative example in the accompanying drawings, in which—

Figure 1:
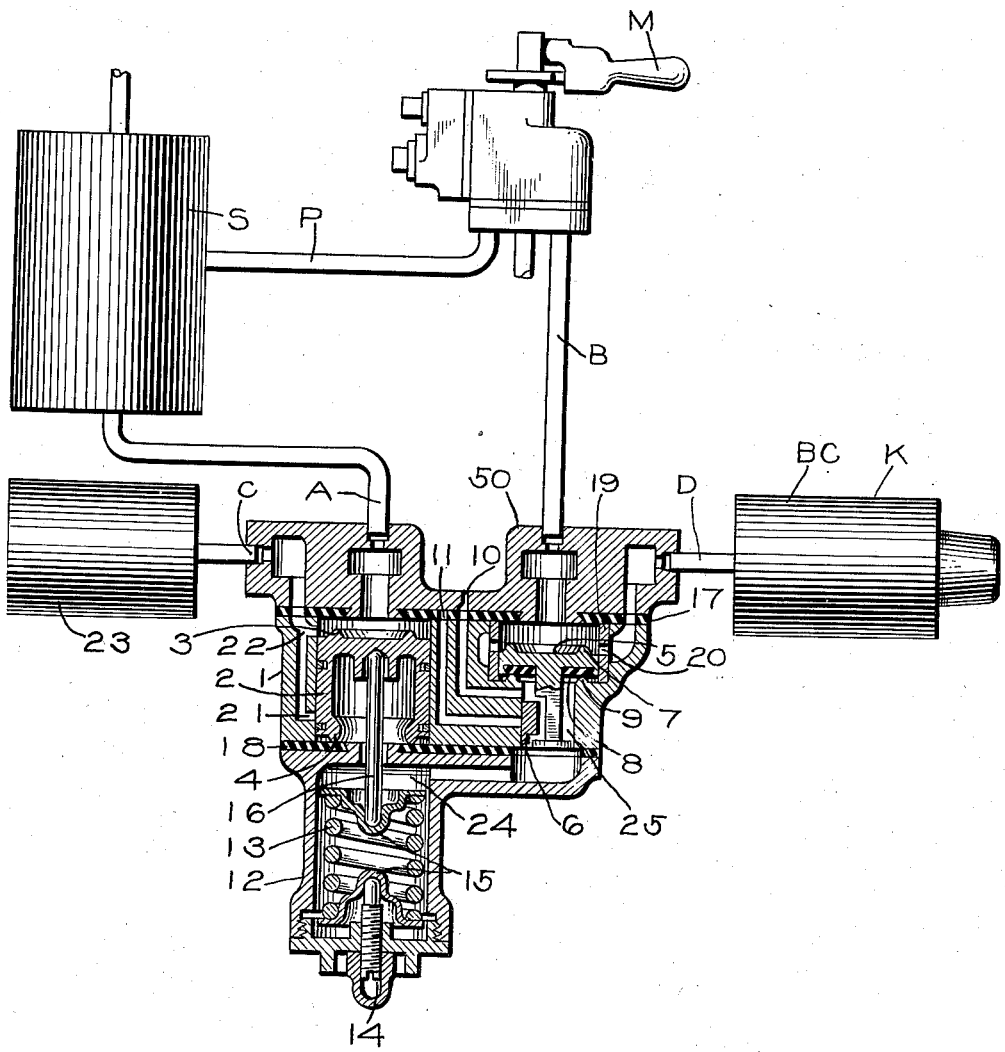
Figure 2:
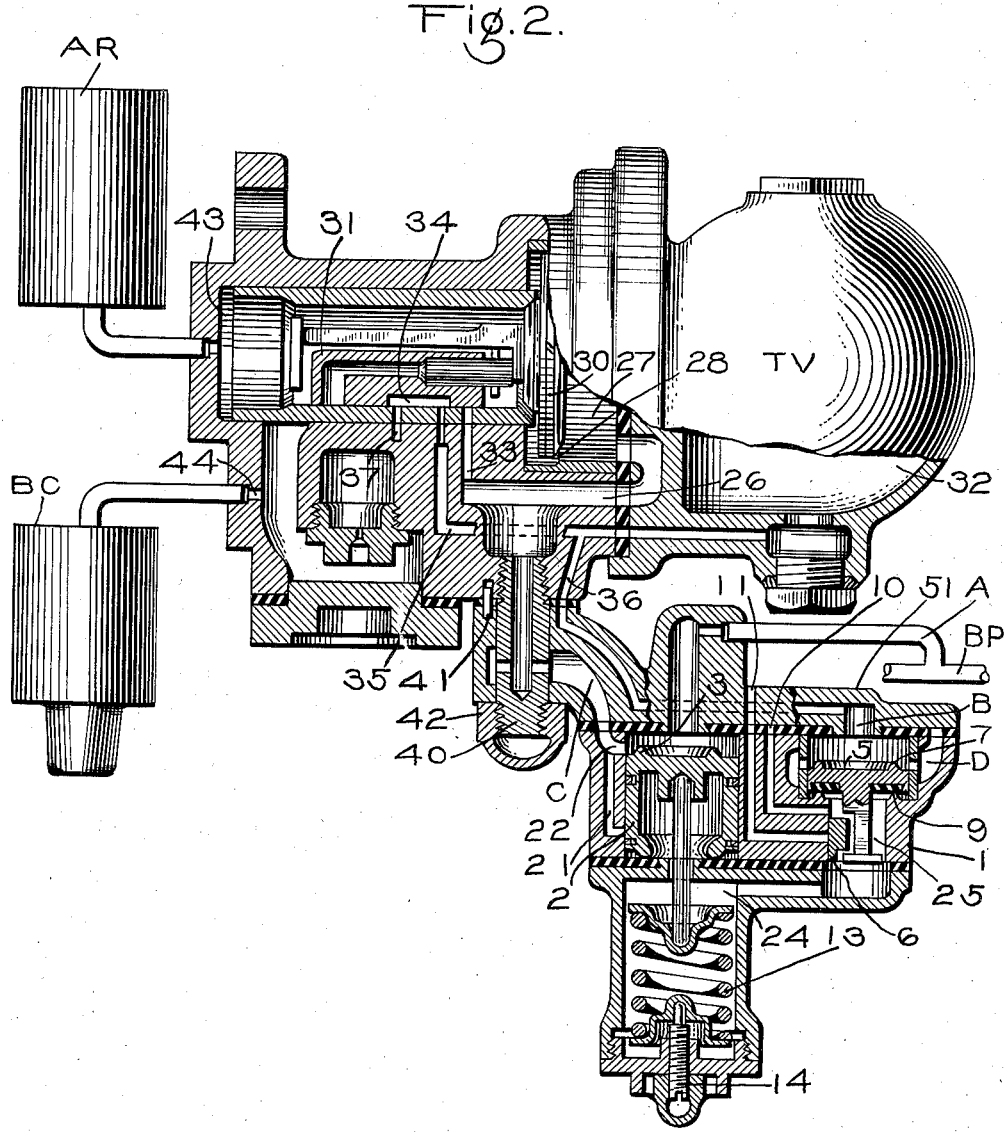

Fig. 1 is a sectional elevation of a device according to the invention as applied to a straight-air braking system, Fig. 2 is a similar view of the same device as applied to an automatic air brake, together with the triple valve thereof, and Fig. 3 shows, in a similar view, an arrangement of the new valve device combined with the operator's brake valve of an automatic air brake system, the other essential elements of the system being shown diagrammatically.

Referring now first to Fig. 1, A is a pipe connected to a main reservoir S of a straight air brake system. B is a pipe connected at one end to a brake valve device M, which may be of the usual self-lapping type, through which fluid under pressure is supplied to and released from a brake cylinder device K, which is connected to a pipe D.

An emergency reservoir 23 is further connected to the valve device through a pipe C. In a casing I of the valve device two piston members 2 and 5 are slidably mounted, and the piston 2 is normally held in its lower position by the main reservoir pressure from pipe A, against the action of a loading spring 13 acting through a cap 15 and a piston rod 16. By means of an adjusting screw 14 the tension of the spring 13 is so adjusted that the piston 2 is pressed upwards to close connection with pipe A by means of an annular seat 3 when the main reservoir pressure falls below a predetermined amount. A gasket 17 assures perfect tightness in that cutting off position. When the piston 2 is in its normal lower position, the pipe C leading to the emergency reservoir 23 is connected with the pipe A through a port 22 so that the emergency reservoir is charged, and leakage beyond piston 2 to chamber 24 is prevented by a seat 4 provided at the lower side of the piston 2 being applied against a gasket 18.

On the other hand it will be apparent that the freely movable piston 5 will likewise normally be in its lower position as shown, since the chamber 25 at its lower side which communicates with chamber 24 and the casing 12 of the spring 13, is vented to the atmosphere through a narrow port 10.

During a normal application of the brakes fluid under pressure supplied from the brake valve to pipe B will act on the piston 5 to keep it in its lower position in which its lower surface provided with a gasket 8 is applied upon an annular seat 9 of the casing so as to prevent leakage of fluid into the chamber 25. In this position of the piston 5 the air is free to pass through openings 20 of a skirt member 19 from pipe B to pipe D to effect an application, or inversely from pipe D to pipe B to effect release of the brakes.

If the main reservoir pressure falls below the pressure for which the spring 13 is adjusted, for example below 50 pounds per square inch, the piston 2 is moved to its upper sealing position thus cutting off connection between the emergency reservoir 23 and the main reservoir pipe A and establishing communication through port 21 from the emergency reservoir 23 to chamber 24 in the valve casing. Since this chamber is permanently connected with chamber 25 under the freely movable piston 5, the latter will be moved upwards whereby a slide valve 6 is operated to blank the restricted atmospheric port 10 and open another port 11 which however in the arrangement of Fig. 1 is not in use and ends blind as illustrated.

Piston 5 is provided at its upper side with an annular seat 7 which in the upper position of piston 5 is applied against the gasket 17 so as to cut off communication between the pipe B and the brake cylinder pipe D, and the piston 5 is so dimensioned that in this position the ports 20 open to the chamber 25 below piston 5, and it will be apparent that emergency reservoir 23 is thus connected with the brake cylinder pipe D through pipe C, port 21, chambers 24 and 25 and ports 20, and consequently an automatic application of the brakes is effected. As further the connection between the pipe D and the application pipe B is cut off by piston 5, the brakes can apparently not be released so long as piston 2 remains in its lower position.

The device can be returned to its normal service position if temporarily the main reservoir pipe A is supplied with a pressure sufficient to overcome while acting on the reduced surface of piston 2, as determined by the annular seat 3, the combined action of the emergency reservoir pressure and pressure of spring 13 acting on the under side of piston 2. As soon as this is the case, piston 2 will return to its lower position where the main reservoir pressure acts on the full upper surface of this piston to keep it down, but piston 5 will not return to its normal lower position until a normal application of the brakes through pipe B is effected, in which case the pressure acting from pipe B on the upper surface of piston 5 will overcome the residuous pressure in chamber 25 and press the piston 5 down and with it slide valve 6 whereupon the chamber 25 is vented through port 10 and normal conditions are reestablished throughout.

The valve casing is preferably made in three separate parts between which the gaskets 17 and 18 are inserted as shown in the figures. Thereby assembling and the application of the same valve devices for other type of brakes is facilitated. In the arrangements shown in Figs. 2 and 3 the same main body 1 and lower portion are used, but the upper portion 50 of Fig. 1 is replaced by other parts 51 and 52 respectively.

In the arrangement of Fig. 2 the valve device is shown as mounted on a triple valve device TV which at 43 is connected with the usual auxiliary or service reservoir AR and at 44 with the brake cylinder BC, whereas between the port C and the branch A of the brake pipe BP normally connected thereto, the new valve device is interposed, the passage B of which is further connected through a special port 36 to passage 35 connecting the pocket 32 with the seat of the regulating slide valve of the triple valve TV. The triple valve TV will not require detailed description as it is of a well known construction.

The upper part 51 of the new valve device which replaces part 50 in Fig. 1 is arranged to blank ports 10 and D whereas port 11 is left open to the atmosphere.

The spring 13 will, as generally when the device is used in an automatic brake system, be so adjusted as to raise piston 2 when at a pressure which is slightly lower than normal equalization pressure.

When fluid under pressure is first admitted through the brake pipe to pipe A for charging the auxiliary reservoir AR, piston 2 will be pressed down against the action of spring 13, and fluid will flow past port 22, passage C and hollow plug 40 into cavity 26 of the triple valve TV connected with the chamber 27 at the right hand side of triple valve piston 30 which will assume its extreme left hand position as illustrated, whereupon the auxiliary reservoir is supplied as usual through feeding groove 28 while pocket 32 is vented to the atmosphere through port 35, port 34 of the slide valve 31 and atmospheric port 37. For a service application of the brakes the pressure in pipe A is reduced at such a rate that the drop of pressure in the chamber 27 is sufficient to move piston 30 to the right taking with it slide valve 31. Pressure will thus be admitted through the usual ports from auxiliary reservoir port 43 to the brake cylinder port 44. At the same time atmospheric port 37 is blanked and connection established through ports 33, 34, 35 from chamber 26 and the brake pipe to pocket 32 and further through ports 36 and B to the upper side of piston 5 which piston is thus kept down on its lower seat 9 as illustrated, in which position atmospheric port 11 is blanked by the slide valve 6. If now pressure in pipe A is further decreased, below the pressure to which spring 13 is adjusted by means of the set screw 14, piston 2 will be raised so as to cut off the brake pipe from the triple valve, and connect chamber 24 and chamber 25 under piston 5 with chamber 26 of the triple valve through port 21. No displacement of piston 5 will however occur, as the same pressure as on its under side acts, through port 36, also on the upper side of this piston.

If, on the other hand, the pressure in the brake pipe A decreases gradually below the pressure determined by the adjustment of spring 13, at so slow a rate as not to effect a service application of the brakes, pocket 32 and the port B leading to the upper side of piston 5 will still be vented to the atmosphere when piston 2 is raised so as to admit pressure from chambers 26 and 27 to the under side of piston 5. Piston 5 will be raised and slide valve 6 will open port 11 so as to establish a wide opening through which chambers 26 and 27 are vented to the atmosphere thus effecting an automatic application of the vehicle brakes. When slide valve 31 of the triple valve reaches application position, piston 5 will be returned to its normal lower position by the residuous pressure in pocket 32, since chamber 25 is fully vented through port 11. The brake will remain in applied condition until normal pressure is reestablished in the brake pipe A.

The additional valve mechanism according to the invention is conveniently secured to the body of the triple valve TV by means of the hollow bolt 40 which is screw threaded at its upper end and provided with a fixed or screwed-on head 42 at its lower end, relative rotation between the triple valve and part 51 being prevented by a positioning pin 41.

Fig. 3 illustrates an equipment for a locomotive or other vehicle provided with a manually controlled brake valve BV, apart from the normal triple valve TV connected in the usual manner with an auxiliary reservoir AR and a brake cylinder BC. The brake valve BV is of the type comprising an equalization piston 46 controlling in a known manner release of fluid under pressure from brake pipe BP. The new valve device is interposed in the connection from a port 47 of brake valve BV to a chamber 48 on top of piston 46, the valve seat 47 being connected to port A of the new valve device and an equalizing reservoir 45 provided between port C of the valve device and chamber 48.

For this purpose the brake valve device is modified in so far as port 47, instead of being conducted inside the brake valve to chamber 48, is conducted to an outer connection 49, and another outer connection port 53 is provided for chamber 48. As part 51 in the case of Fig. 2, part 52 is arranged to blank ports 10 and D and to provide an outlet to the atmosphere for port 11. Port B is connected to the brake cylinder through a pipe 44. Under normal running conditions when the brake valve BV is in the illustrated position, both pistons 2 and 5 will apparently occupy their lower positions as illustrated. If pressure is reduced in the brake valve BV for an application of the brakes, brake cylinder pressure is admitted through pipe 44 and port B to the upper side of piston 5 so as to keep it down, and when the pressure at 47 falls below the pressure adjusted at the spring 13 of the piston 2, piston 2 will be raised by its spring 13 so as to cut off connection to the valve port 47 and connect the equalizing reservoir 45 with chambers 24 and 25.

If, as preferred, spring 13 is adjusted for a pressure slightly below normal equalization pressure, the brakes will at that time be fully applied so that the pressure acting on the upper side of piston 5 from the brake cylinder BC will be at least equal to that acting on the lower side of that piston, and piston 5 will remain in its lower position blanking by its slide valve 6 the atmospheric port 11. If, on the other hand, the pressure in port A falling at a very slow rate so as not to effect application of the brakes by means of the triple valve TV, reaches the value at which piston 2 is raised by its spring 13, no substantial pressure will act on the upper side of piston 5 when pressure from reservoir 45 is admitted to chamber 25 and the lower side of piston 5, and piston 5 will accordingly be raised and slide valve 6 will open the atmospheric port 11, so that reservoir 45 and the chamber 48 on top of equalization piston 46 is vented to the atmosphere.

Thus equalization piston 46 will rise and effect an automatic application of the brakes by venting the brake pipe BP in the usual manner. Piston 5 will automatically be returned to its normal lower position as soon as the brakes are applied and pressure is admitted to its upper side from brake cylinder BC when the pressure at its lower side has dropped sufficiently owing to the venting through opening 11. It will be noted that the escaping of air through opening 11 indicates to the operator the operation of the safety device so as to enable him to take proper action, and a whistle or other indicating means may if desired be arranged to be operated by the outflowing air.

Evidently the invention is not restricted to the examples described, and various modifications may be made without departing from the scope of the invention. For example, if the device is only to be used for automatic brakes, it may be sufficient in some cases to replace piston 5 and the ports 11 and B by a small reservoir or bulb, if further means are provided for venting this reservoir when piston 2 is in its lowermost position. It will further be evident that the device of Fig. 2 may be used if desired even in vehicles in which no automatic brake is provided for normal service applications of the brakes. This arrangement may also be used in railcars and the like instead of the arrangement of Fig. 3 although these vehicles are provided with an operator's brake valve.

Having now described my invention, what I claim as new and desire to secure by Letters Patent, is:

1. In a fluid pressure brake system, in combination, a brake pipe, an automatic valve device operative upon a reduction in brake pipe pressure to effect an application of the brakes, and a valve mechanism controlling communication between the brake pipe and the automatic valve device and operative so long as brake pipe pressure is above a predetermined value to hold said communication open and operative when brake pipe pressure falls below said predetermined value to close said communication and establish a different communication through which fluid under pressure is released from the automatic valve device to cause it to move to a position for applying the brakes.

2. In a fluid pressure brake system, in combination, a brake pipe, a movable abutment contained in a chamber adapted to be supplied with fluid under pressure from the brake pipe and operative upon a reduction of pressure in said chamber to effect an application of the brakes, and a valve mechanism controlling communication between the brake pipe and the chamber and operative so long as the brake pipe pressure is above a predetermined value to hold said communication open and operative when brake pipe pressure falls below said predetermined value to close said communication and establish another communication through which fluid under pressure is released from the chamber to cause said abutment to move to a position for applying the brakes.

3. In a fluid pressure brake system, in combination, a brake pipe, an automatic valve device operative upon a reduction in brake pipe pressure to effect an application of the brakes, and a valve mechanism controlling communication between the brake pipe and the automatic valve device and operative so long as brake pipe pressure is above a predetermined value to hold said communication open and operative when brake pipe pressure falls below said predetermined value to close said communication and establish a different communication through which fluid under pressure is released from the automatic valve device to the atmosphere to effect an application of the brakes, said valve mechanism comprising a valve operative by fluid pressure in said different communication to open said different communication to the atmosphere, and being also operative by fluid under pressure supplied from the brake pipe by said automatic valve device to hold said different communication isolated from the atmosphere.

4. In a fluid pressure brake system, in combination, a brake pipe, an equalizing reservoir, a brake valve device operative in one position to control a communication through which fluid under pressure is supplied from the brake pipe to the equalizing reservoir for charging same and operative in another position to cut off said communication and open another communication through which fluid under pressure is vented from said reservoir to effect an application of the brakes, a valve mechanism for also controlling the flow of fluid through said first mentioned communication and operative so long as brake pipe pressure is above a predetermined value to hold said communication open and operative when brake pipe pressure falls below said predetermined value to close said communication and establish a different communication through which fluid under pressure is released from said reservoir to effect an application of the brakes.

5. In a fluid pressure system, in combination, a brake pipe, an equalizing reservoir, a brake valve device operative in one position to control a communication through which fluid under pressure is supplied from the brake pipe to the equalizing reservoir for charging same and operative in another position to cut off said communication and open another communication through which fluid under pressure from said reservoir is vented to effect a reduction in brake pipe pressure, a valve mechanism for also controlling the flow of fluid through the first mentioned communication and operative so long as brake pipe pressure is above a predetermined value to hold said communication open and operative when brake pipe pressure falls below said predetermined value to close said communication and open a passage through which fluid under pressure is released from said reservoir to effect a reduction in brake pipe pressure, said valve mechanism including a valve means for controlling said passage, a brake cylinder, and an automatic valve device operative upon a reduction in brake pipe pressure to supply fluid under pressure to the brake cylinder to effect an application of the brakes and at the same time to supply fluid under pressure to said valve means for operating it to hold said passage closed.

6. In a fluid pressure brake, in combination, an equalizing reservoir, a brake pipe, an engineer's brake valve comprising an equalizing piston subject to fluid pressure in the equalizing reservoir and adapted to control a vent valve which is operative in application position to vent fluid under pressure from the brake pipe to initiate an application of the brakes, a valve mechanism interposed between said brake valve and said equalizing reservoir for controlling a communication therebetween and operative so long as brake pipe pressure is above a predetermined degree to hold said communication open and operative when brake pipe pressure falls below said predetermined degree to close said communication and at the same time open a passage for releasing fluid under pressure from said reservoir for effecting operation of said equalizing piston to application position, a piston valve for controlling said communication, and means responsive to operation of said vent valve for effecting an application of the brakes and at the same time supplying fluid under pressure to said valve means for operating it to hold said passage closed.

7. In a fluid pressure brake system, in combination, a brake pipe, an equalizing reservoir, a brake valve device operative in at least one position to control a first communication through which fluid under pressure is supplied from the brake pipe to the equalizing reservoir for charging same and operative in another position to cut off said first communication and open a second communication through which fluid under pressure from said reservoir is released to initiate an application of the brakes, and a valve mechanism operative when said brake valve is in said one position to also control the flow of fluid through said first communication, said mechanism being operative so long as brake pipe pressure is above a predetermined value to hold said first communication open and operative when brake pipe pressure falls below said predetermined value to close said first communication and establish a third communication through which fluid under pressure is released from said reservoir to initiate an application of the brakes, and means operative upon the release of fluid under pressure from said reservoir through either said second or said third communication for effecting an application of the brakes and at the same time operative to close said third communication when said brake valve device is moved to said other position to open said second communication.

8. In a fluid pressure brake system, in combination, a brake pipe, an automatic valve device operative upon a reduction in brake pipe pressure to effect an application of the brakes, and a valve mechanism comprising a piston operated valve disposed in a chamber and having a normal position for closing a connection from said chamber to the atmosphere and another position for opening said connection upon the supply of fluid under pressure to said chamber and a movable abutment for controlling communication between the brake pipe and the automatic valve device and operative so long as brake pipe pressure is above a predetermined value to hold said communication open and operative when brake pipe pressure falls below said predetermined value to close said communication and establish a different communication through which fluid under pressure is released from the automatic valve device to said chamber to cause said piston operated valve to open said connection to effect an application of the brakes.

9. In a fluid pressure system, in combination, a brake pipe, a triple valve device comprising a movable abutment contained in a chamber adapted to be supplied with fluid under pressure from the brake pipe and a volume normally connected to the atmosphere, said movable abutment being operative upon a reduction of pressure in the chamber to supply fluid under pressure from the brake pipe to said volume and to effect an application of the brakes, a valve mechanism comprising a piston operated valve and a spring weighted piston, said piston controlling communication between the brake pipe and the chamber and operative so long as brake pipe pressure is above a predetermined value to hold said communication open and operative when brake pipe pressure falls below said predetermined value to close said communication and open a passage through which fluid under pressure may be released from the chamber, said piston operated valve controlling said passage and having a piston chamber connected to said volume adapted to be supplied with fluid pressure from said volume, said piston operated valve being operative by fluid pressure supplied to said passage to open said passage to the atmosphere for effecting an application of the brakes unless said movable abutment has already operated to supply fluid under pressure from the brake pipe to said volume and to said piston chamber.

10. In a fluid pressure brake, in combination, a valve device subject to a control fluid pressure and movable thereby to a normal position when the pressure of the fluid exceeds a chosen degree and movable out of said normal position in case the pressure of said fluid is reduced to less than said chosen degree, a control valve means having an abutment subject on one side to fluid pressure in a first chamber and on the other side to fluid pressure in a second chamber, and being operative to control venting of fluid pressure from said second chamber to the atmosphere to effect an application of the brakes, said valve device being operative upon movement out of said normal position to supply fluid under pressure to said second chamber to cause said abutment to move to a position for effecting venting of fluid from said second chamber to the atmosphere, and other valve means for effecting an application of the brakes and at the same time supplying fluid under pressure to said first chamber to cause said abutment to move to a position where said control valve means prevents venting of fluid under pressure to the atmosphere from said second chamber when the brakes are applied by said other means.

ANSELME NEVEU.